(12) United States Patent
Kwon et al.

(10) Patent No.: US 10,310,589 B2
(45) Date of Patent: Jun. 4, 2019

(54) DISPLAY DEVICE INCLUDING POWER CONTROL DEVICE

(71) Applicant: SAMSUNG DISPLAY CO., LTD., Yongin-si, Gyeonggi-do (KR)

(72) Inventors: Soon-Gi Kwon, Yongin-si (KR); Sung-Cheon Park, Yongin-si (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 201 days.

(21) Appl. No.: 15/408,015

(22) Filed: Jan. 17, 2017

(65) Prior Publication Data

US 2017/0123483 A1 May 4, 2017

Related U.S. Application Data

(62) Division of application No. 13/792,605, filed on Mar. 11, 2013, now Pat. No. 9,552,030.

(30) Foreign Application Priority Data

Nov. 19, 2012 (KR) .................. 10-2012-0131187

(51) Int. Cl.
*G06F 9/00* (2006.01)
*G06F 1/3287* (2019.01)
(Continued)

(52) U.S. Cl.
CPC .............. *G06F 1/3287* (2013.01); *G06F 1/30* (2013.01); *G06F 1/3265* (2013.01);
(Continued)

(58) Field of Classification Search
CPC ........ G06F 1/3287; G06F 1/30; G06F 1/3265; G06F 1/3296; G09G 3/2092;
(Continued)

(56) References Cited

U.S. PATENT DOCUMENTS 5,850,127 A 12/1998 Zhu et al.
7,348,959 B2 * 3/2008 Kim ..................... G09G 3/3406
345/102
(Continued)

FOREIGN PATENT DOCUMENTS

JP 2000-273447 A 10/2000
JP 2009-195073 A 8/2009
(Continued)

*Primary Examiner* — Aurel Prifti
(74) *Attorney, Agent, or Firm* — Lee & Morse P.C.

(57) ABSTRACT

A power controller includes an inductor coupled to an input terminal to which an input voltage is input, a first switch coupled between the inductor and a first power source voltage output terminal, a second switch coupled between the inductor and a ground, a switch controller controlling a voltage output to the first power source voltage output terminal by controlling duties of the first and second switches according to a feedback voltage input to a feedback terminal corresponding to a voltage output to the first power source voltage output terminal, and a diode coupled between the first power source voltage output terminal and the feedback terminal, and preventing a voltage of the first power source voltage output terminal from increasing higher than a breakdown voltage of the first and second switches.

11 Claims, 2 Drawing Sheets

(51) Int. Cl.
  *G06F 1/30* (2006.01)
  *H02M 1/32* (2007.01)
  *H02M 3/158* (2006.01)
  *G09G 3/20* (2006.01)
  *G06F 1/3234* (2019.01)
  *G06F 1/3296* (2019.01)
  *H02M 1/00* (2006.01)

(52) U.S. Cl.
  CPC ......... *G06F 1/3296* (2013.01); *G09G 3/2092* (2013.01); *H02M 1/32* (2013.01); *H02M 3/158* (2013.01); *G09G 2330/02* (2013.01); *H02M 3/1588* (2013.01); *H02M 2001/0025* (2013.01); *Y02B 70/1466* (2013.01)

(58) Field of Classification Search
  CPC .... G09G 2330/02; H02M 1/32; H02M 3/158; H02M 3/1588; H02M 2001/0025; Y02B 70/1466
  USPC .............. 345/76, 690, 212, 102; 361/90, 18; 36/91; 323/285; 307/82
  See application file for complete search history.

(56) References Cited

U.S. PATENT DOCUMENTS

| | | |
|---|---|---|
| 8,749,458 B2 | 6/2014 | Kim |
| 2006/0125454 A1 | 6/2006 | Chen et al. |
| 2006/0176098 A1 | 8/2006 | Chen et al. |
| 2007/0097574 A1* | 5/2007 | Mahin .................. H02M 3/158 361/90 |
| 2007/0257645 A1 | 11/2007 | Nishino |
| 2008/0043504 A1 | 2/2008 | Ye et al. |
| 2008/0094861 A1 | 4/2008 | Wang |
| 2008/0130325 A1 | 6/2008 | Ye |
| 2008/0246455 A1 | 10/2008 | Chu et al. |
| 2009/0009104 A1 | 1/2009 | Doi et al. |
| 2009/0094861 A1* | 4/2009 | Orvitz .................. A43B 1/0081 36/91 |
| 2009/0219275 A1* | 9/2009 | Jeon ......................... G09G 3/32 345/212 |
| 2009/0244110 A1* | 10/2009 | Ogura .................. G09G 3/3233 345/690 |
| 2009/0273290 A1* | 11/2009 | Ziegenfuss ........ H05B 33/0815 315/193 |
| 2010/0013867 A1* | 1/2010 | Kim ..................... G09G 3/3233 345/690 |
| 2010/0220039 A1* | 9/2010 | Park .................... H02M 3/1588 345/76 |
| 2010/0220088 A1* | 9/2010 | Kim ..................... G09G 3/3208 345/211 |
| 2010/0309758 A1 | 12/2010 | Zhang et al. |
| 2011/0001731 A1 | 1/2011 | Park et al. |
| 2011/0157246 A1 | 6/2011 | Jang |
| 2011/0291634 A1* | 12/2011 | Takata .................... H02M 1/32 323/285 |
| 2012/0001603 A1 | 1/2012 | Ouyang et al. |
| 2012/0007433 A1* | 1/2012 | Wei ......................... H02M 1/10 307/82 |
| 2012/0049830 A1 | 3/2012 | Watanabe |
| 2012/0050249 A1* | 3/2012 | Jin ........................... G09G 3/20 345/212 |
| 2012/0050346 A1* | 3/2012 | Sung ..................... G09G 3/3233 345/690 |
| 2012/0200967 A1 | 8/2012 | Mikolajczak |
| 2012/0229111 A1 | 9/2012 | Serdarevic |
| 2012/0274300 A1 | 11/2012 | Nakashima |
| 2013/0082910 A1 | 4/2013 | Lee |
| 2013/0127429 A1 | 5/2013 | Li |
| 2013/0241808 A1* | 9/2013 | Kwon .................... H02M 3/158 345/76 |
| 2013/0293267 A1 | 11/2013 | Gravati et al. |
| 2015/0108954 A1 | 4/2015 | Yu et al. |
| 2015/0146328 A1* | 5/2015 | Mikami ............... H02H 7/1213 361/18 |
| 2016/0323947 A1* | 11/2016 | Seki .................... H05B 33/0815 |

FOREIGN PATENT DOCUMENTS

| | | |
|---|---|---|
| KR | 1999-0031364 U | 7/1999 |
| KR | 10-2000-0020856 A | 4/2000 |
| KR | 10-2005-0118088 A | 12/2005 |
| KR | 10-2012-0010583 A | 2/2012 |
| KR | 10-2012-0078968 A | 7/2012 |

* cited by examiner

DISPLAY DEVICE INCLUDING POWER CONTROL DEVICE

CROSS-REFERENCE TO RELATED APPLICATIONS

This is a divisional application based on pending application Ser. No. 13/792,605, filed Mar. 11, 2013, the entire contents of which is hereby incorporated by reference.

This application claims priority to and the benefit of Korean Patent Application No. 10-2012-0131187 filed in the Korean Intellectual Property Office on Nov. 19, 2012, the entire contents of which are incorporated herein by reference.

BACKGROUND

1. Field

Embodiments relate to a power controller and a display device including the same.

2. Description of the Related Art

A power voltage generated using a DC-DC converter may be used as a power source voltage supplying driving power. When the power source voltage cannot be constantly supplied and is unstably changed, a display device may perform erroneous operation. Accordingly, the DC-DC converter should generate a stable power source voltage.

The above information disclosed in this Background section is only for enhancement of understanding of the background of the invention and therefore it may contain information that does not form the prior art that is already known in this country to a person of ordinary skill in the art.

SUMMARY

Embodiments are directed to a power controller, including an inductor coupled to an input terminal to which an input voltage is input, a first switch coupled between the inductor and a first power source voltage output terminal, a second switch coupled between the inductor and a ground, a switch controller controlling a voltage output to the first power source voltage output terminal by controlling duties of the first and second switches according to a feedback voltage input to a feedback terminal corresponding to a voltage output to the first power source voltage output terminal, and a diode coupled between the first power source voltage output terminal and the feedback terminal, and preventing a voltage of the first power source voltage output terminal from increasing higher than a breakdown voltage of the first and second switches.

A threshold voltage of the diode may correspond to a voltage difference between the voltage of the first power source voltage output terminal and the feedback voltage when the voltage of the first power source voltage output terminal is lower by a predetermined level than the breakdown voltage of the first and second switches.

When a voltage difference between the voltage of the first power source voltage output terminal and the feedback voltage reaches the threshold voltage of the diode, the feedback terminal may be coupled to the first power source voltage output terminal through the diode.

The power controller may further include a first differential amplifier including a first input terminal to which the feedback voltage is input, a second input terminal to which a first reference voltage is input, and an output terminal outputting an over-voltage protection signal that corresponds to a voltage difference between the feedback voltage and the first reference voltage.

The power controller may further include a third switch coupled between the first switch and the first power source voltage output terminal, wherein the switch controller controls turning on and off of the third switch according to the over-voltage protection signal.

The power controller may further include a first resistor and a second resistor coupled in series between the feedback terminal and a ground and by which a voltage corresponding to a voltage difference between the feedback voltage and a ground voltage is divided.

The power controller may further include a second differential amplifier including a first input terminal to which a voltage divided between the first resistor and the second resistor is input, a second input terminal to which a second reference voltage is input, and an output terminal outputting a voltage error signal that corresponds to a voltage difference between the divided voltage and the second reference voltage.

The power controller may further include a third differential amplifier including a first input terminal to which a first pulse width control signal is input, a second input terminal to which the voltage error signal is input, and an output terminal outputting a second pulse width control signal that corresponds to a voltage difference between the first pulse width control signal and the voltage error signal.

The switch controller may control the duties of the first and second switches according to the second pulse width control signal.

The power controller may further include a first capacitor including a first electrode coupled to the first power source voltage output terminal, and a second electrode coupled to a ground.

The power controller may further include a second capacitor including a first electrode coupled to a second power source voltage terminal having a low level voltage relative to a high level voltage of the first power source voltage output terminal, and a second electrode coupled to a ground.

Embodiments are also directed to a display device, including a plurality of pixels, and a power controller supplying a first power source voltage and a second power source voltage to the plurality of pixels. The power controller may output the first power source voltage to a first power source voltage output terminal by converting an input voltage, control the first power source voltage by controlling a duty of a switch according to a feedback voltage input through a feedback voltage corresponding to the first power source voltage, and prevent the first power source voltage from increasing higher than a breakdown voltage of the switch using a diode coupled between the first power source voltage output terminal and the feedback terminal.

The power controller may include an inductor coupled to an input terminal to which the input voltage is input, and the switch may include a first switch coupled between the inductor and the first power source voltage output terminal, and a second switch coupled between the inductor and a ground.

A threshold voltage of the diode may correspond to a voltage difference between the first power source voltage and the feedback voltage when the first power source voltage is lower by a predetermined level than a breakdown voltage of the first and second switches.

When the voltage difference between the first power source voltage and the feedback voltage reaches the threshold voltage of the diode, the feedback terminal may be coupled to the first power source voltage output terminal through the diode.

The power controller may further include a first differential amplifier including a first input terminal to which the feedback voltage is input, a second input terminal to which a first reference voltage is input, and an output terminal outputting an over-voltage protection signal that corresponds to a voltage difference between the feedback voltage and the first reference voltage.

The power controller may further include a third switch coupled between the first switch and the first power source voltage output terminal and controls turning on and off of the third switch according to the over-voltage protection signal.

The power controller may further include a first resistor and a second resistor coupled in series between the feedback terminal and a ground and dividing a voltage that corresponds to a voltage difference between the feedback voltage and a ground voltage.

The power controller may further include a second differential amplifier including a first input terminal to which a voltage divided between the first resistor and the second resistor is input, a second input terminal to which a second reference voltage is input, and an output terminal outputting a voltage error signal that corresponds to a voltage difference between the divided voltage and the second reference voltage.

The power controller may further include a third differential amplifier including a first input terminal to which a first pulse width control signal is input, a second input terminal to which the voltage error signal is input, and an output terminal outputting a second pulse width control signal that corresponds to a voltage difference between the first pulse width control signal and the voltage error signal.

The power controller may control duties of the first and second switches according to the second pulse width control signal.

The power controller may further include a first capacitor including a first electrode coupled to the first power source voltage output terminal, and a second electrode coupled to a ground.

The power controller further may include a second capacitor including a first electrode coupled to a second power source voltage terminal having the second power source voltage, and a second electrode coupled to a ground.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
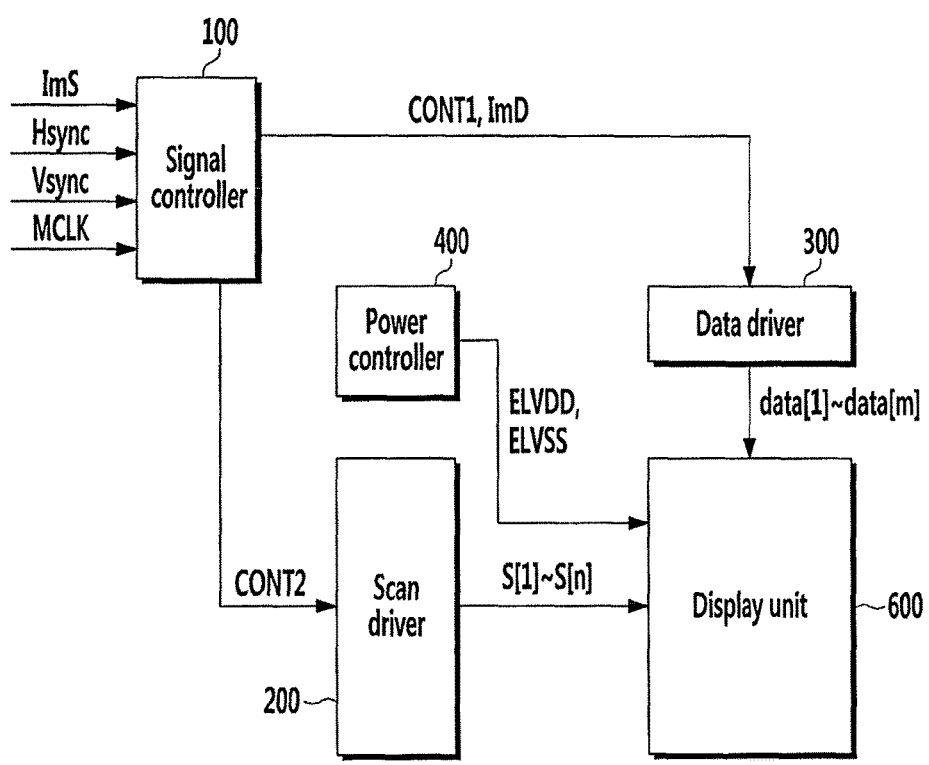
FIG. 1 is a block diagram of a display device according to an example embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "on" another element, it can be directly on the other element, or one or more intervening elements may also be present. It will also be understood that when an element is referred to as being "under" another element, it can be directly under, or one or more intervening elements may also be present. It will also be understood that when an element is referred to as being "between" two elements, it can be the only element between the two elements, or one or more intervening elements may also be present. Like reference numerals refer to like elements throughout.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising," will be understood to imply the inclusion of stated elements but not the exclusion of any other elements.

FIG. 1 is a block diagram of a display device according to an example embodiment.

In the example embodiment shown in FIG. 1, a display device 10 includes a signal controller 100, a scan driver 200, a data driver 300, a power controller 400, and a display unit 600.

The signal controller 100 receives an image signal ImS and a synchronization signal input from an external device. The input video signal ImS contains luminance information of a plurality of pixels. Luminance has a predetermined number of grays, for example, 1024 ($=2^{10}$), 256 ($=2^8$), or 64 ($=2^6$). The synchronization signal includes a horizontal synchronization signal Hsync, a vertical synchronization signal Vsync, and a main clock signal MCLK.

The signal controller 100 generates first to third driving control signals CONT1, CONT2, and CONT3 and an image data signal ImD according to the image signal ImS, the horizontal synchronization signal Hsync, the vertical synchronization signal Vsync, and the main clock signal MCLK.

The signal controller 100 divides the image signal ImS per frame unit according to the vertical synchronization signal Vsync, and generates the image data signal ImD by dividing the image signal ImS per scan line unit according to the horizontal synchronization signal Hsync. The signal controller 100 transmits the image data signal ImD and the first driving control signal CONT1 to the data driver 300.

The display unit 600 has a display area including a plurality of pixels. In the display unit 600, a plurality of scan lines extended substantially in a row direction and almost parallel with each other, a plurality of data lines extended substantially in a column direction and almost parallel with each other, and a plurality of power lines are formed and coupled to the plurality of pixels. The plurality of pixels are substantially arranged in a matrix format in crossing areas of the plurality of scan lines and the plurality of data lines.

The scan driver 200 is coupled to plurality of scan lines, and generates a plurality of scan signals S[1] to S[n] according to the second driving control signal CONT2. The scan driver 200 may sequentially apply scan signals S[1] to S[n] of a gate-on voltage to the plurality of scan lines.

The data driver 300 is coupled to the plurality of data lines, samples and holds the image data signal ImD input according to the first driving control signal CONT1, and transmits a plurality of data signals data[1] to data[m] to the plurality of data lines. The data driver 300 applies a data signal having a predetermined voltage range to the plurality of data lines corresponding to the scan signals S[1] to S[n] of the gate-on voltage.

The power controller 400 supplies a first power source voltage ELVDD and a second power source voltage ELVSS to power lines coupled to the plurality of pixels. The first power source voltage ELVDD and the second power source voltage ELVSS provide a driving current of a pixel. The power controller 400 receives a feedback voltage Vfeedback of the first power source voltage ELVDD supplied to the display unit 600 and controls the first power source voltage ELVDD to be stably generated with a predetermined voltage level. If the feedback voltage Vfeedback is increased and the first power source voltage ELVDD is increased, e.g., due to instantaneous short or electrostatic discharge, the power controller 400 may prevent the first power source voltage ELVDD from being higher than a breakdown voltage of a switch in an internal circuit using a diode.

Figure 2:
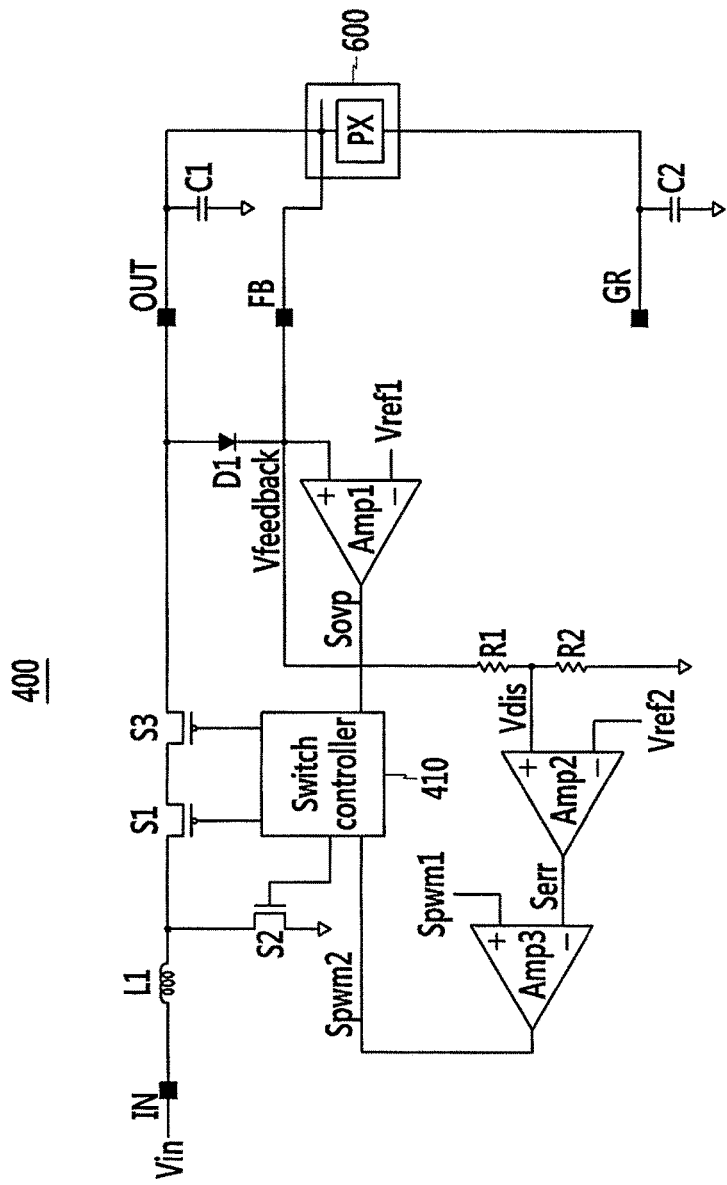
FIG. 2 is a circuit diagram of a power controller according to an example embodiment.

FIG. 2 is a circuit diagram of a power controller of the display device according to the example embodiment.

In the example embodiment shown in FIG. 2, a power controller 400 includes a plurality of switches S1, S2, and S3, a plurality of differential amplifiers Amp1, Amp2, and Amp3, an inductor L1, a plurality of resistors R1 and R2, a plurality of capacitors C1 and C2, a diode D1, and a switch controller 410.

The inductor L1 includes a first electrode coupled to an input terminal IN to which an input voltage Vin is input and a second electrode coupled to a first electrode of the first switch S1. The input voltage Vin may be a direct current (DC) voltage supplied from an external power source.

The first switch S1 includes a gate electrode coupled to the switch controller 410, the first electrode coupled to the second electrode of the first inductor L1, and a second electrode coupled to a first electrode of the third switch S3.

The second switch S2 includes a gate electrode coupled to the switch controller 410, a first electrode coupled to the second electrode of the first inductor L1, and a second electrode being grounded.

The third switch S3 includes a gate electrode coupled to the switch controller 410, a first electrode coupled to the second electrode of the first switch S1, and a second electrode coupled to a first power source voltage output terminal OUT.

The first power source voltage output terminal OUT is coupled to the display unit 600. A voltage output through the first power source voltage output terminal OUT may be the first power source voltage ELVDD.

The first switch S1 and the third switch S3 may be p-channel field effect transistors and the second switch S2 may be an n-channel field effect transistor. A gate-on voltage that turns on the p-channel field effect transistor is a low level voltage and a gate-off voltage that turns off the p-channel field effect transistor is a high level voltage. A gate-on voltage that turns on the n-channel field effect transistor is a high level voltage and a gate-off voltage that turns off the n-channel field effect transistor is a low level voltage. The type of the first to third switches S1, S2, and S3 is not limited, and one or more of the first to third switches S1, S2, and S3 may be a p-channel field effect transistor and one or more of the first to third switches S1, S2, and S3 may be an n-channel field effect transistor.

The first capacitor C1 includes a first electrode coupled to the first power source voltage output terminal OUT and a second electrode being grounded. The first capacitor C1 may prevent a voltage of the first power source voltage output terminal OUT, that is, the first power source voltage ELVDD, from changing too rapidly.

The diode D1 includes a first electrode coupled to the first power source voltage output terminal OUT and a second electrode coupled to a feedback terminal FB. When a voltage difference between the voltage of the first power source voltage output terminal OUT and a voltage of the feedback terminal FB reaches a threshold voltage of the first diode D1, the first diode D1 is coupled and thus the first power source voltage output terminal OUT and the feedback terminal FB become coupled to each other.

The feedback terminal FB may be coupled to the plurality of power lines transmitting the first power source voltage ELVDD to each of the plurality of pixels. The feedback terminal FB and the first power source voltage output terminal OUT may be coupled to each other through the plurality of power lines of the display unit 600, and the feedback voltage Vfeedback input to the feedback terminal FB may be a voltage to which an influence of a voltage drop due to the plurality of power lines is reflected. The feedback voltage Vfeedback corresponds to a voltage output to the first power source voltage output terminal OUT. Here, the drawing illustrates only one pixel PX among the plurality of pixels PX included in the display unit 600.

The first differential amplifier Amp1 includes a first input terminal (+) coupled to the feedback terminal FB and thus receiving the feedback voltage Vfeedback, a second input terminal (−) to which a first reference voltage Vref1 is input, and an output terminal through which a voltage difference between the feedback voltage Vfeedback and the first reference voltage Vref1 is amplified with a constant gain and then output. The first reference voltage Vref1 is predetermined voltage for over-voltage protection (OVP). An over-voltage protection signal Sovp that corresponds to the voltage difference between the feedback voltage Vfeedback and the first reference voltage Vref1 is transmitted through the output terminal of the first differential amplifier Amp1.

The first resistor R1 includes a first electrode coupled to the feedback terminal FB and a second electrode coupled to a first electrode of the second resistor R2. The second resistor R2 includes the first electrode coupled to the second electrode of the first resistor R1 and a second electrode being grounded. That is, the first resistor R1 and the second resistor R2 are coupled in series between the feedback terminal FB and the ground.

A voltage corresponding to a voltage difference between the feedback voltage Vfeedback and a ground voltage is divided to the first resistor R1 and the second resistor R2. A divided voltage Vdis between the first resistor R1 and the second resistor R2 has a voltage value between the feedback voltage Vfeedback and the ground voltage according to resistance of the first resistor R1 and the second resistor R2.

The second differential amplifier Amp2 includes a first input terminal (+) to which the divided voltage Vdis is input, a second input terminal (−) to which a second reference voltage Vref2 is input, and an output terminal through which a voltage difference between the divided voltage Vdis and a second reference voltage Vref is amplified with a constant gain and then output. The second reference voltage Vref2 is a voltage predetermined for adjusting a voltage error of the first power source voltage ELVDD. A voltage error signal Serr corresponding to the voltage difference between the divided voltage Vdis and the second reference voltage Vref2 is output through the output terminal of the second differential amplifier Amp2.

The third differential amplifier Amp3 includes a first input terminal (+) to which a first pulse width control signal Spwm1, a second input terminal (−) to which the voltage error signal Serr, and an output terminal through which a second pulse width control signal Spwm2 corresponding to voltage difference between the first pulse width control signal Spwm1 and the voltage error signal Serr is amplified with a constant gain and then output. The first pulse width control signal Spwm1 may be predetermined to control a duty of the first switch S1 and a duty of the second switch S2. The second pulse width control signal Spwm2 corresponding to the voltage difference between the first pulse width control signal Spwm1 and the voltage error signal Serr is output through the output terminal of the third differential amplifier Amp3. The second pulse width control signal Spwm2 is transmitted to the switch controller 410.

The second capacitor C2 includes a first electrode coupled to a second power source voltage terminal, which may be low voltage terminal GR, and a second electrode being grounded. The low voltage terminal GR is coupled to the display unit 600. A voltage of the low voltage terminal GR may be the second power source voltage ELVSS. The low voltage terminal GR has a low level voltage, which may be opposite to a high level voltage of the first power source voltage output terminal OUT, for driving of the plurality of pixels PX included in the display unit 600, that is, for driving of a load. Here, the low level voltage of the first power source voltage output terminal, low voltage terminal GR, may be a ground voltage or a voltage generated from an additional voltage generation element (not shown).

The switch controller 410 controls switching operation of the first and second switches S1 and S2 according to the second pulse width control signal Spwm2 to convert the input voltage Vin and transmit the converted voltage to the first power source voltage output terminal OUT. In this case, the switch controller 410 maintains the third switch S3 is the turn-on state.

When the first switch S1 is turned off and the second switch S2 is turned on, the amount of current transmitted to the ground through the inductor L1 is increased such that energy is stored in the inductor L1. When the first switch S1 is turned off and the second switch S2 is turned on, a source of the first switch S1 is coupled to the ground through the second switch S2 and a drain of the first switch S1 is coupled to the first power source voltage output terminal OUT, such that a voltage across the first switch S1 becomes equivalent to the voltage of the first power source voltage output terminal OUT.

When the first switch S1 is turned on and the second switch S2 is turned off, a current generated by the energy stored in the inductor L1 is transmitted to the first power source voltage output terminal OUT. Then, the voltage of the first power source voltage output terminal OUT is increased. During this period, the energy stored in the inductor L1 is reduced. When the first switch S1 is turned on and the second switch S2 is turned off, a drain of the second switch S2 is coupled to the first power source voltage output terminal OUT through the first switch S1 and a source of the second switch S2 is coupled to the ground, such that a voltage across the second switch S2 becomes equivalent to the voltage of the first power source voltage output terminal OUT.

When the first switch S1 is turned off and the second switch S2 is turned on, energy is stored in the first inductor L1 and the voltage of the first power source voltage output terminal OUT is decreased.

As described, the switch controller 410 alternately turns on the first switch S1 and the second switch S2 to control the amount of current and the level of voltage transmitted to the first power source voltage output terminal OUT. The amount of current and the level of voltage transmitted to the first power source voltage output terminal OUT are determined according to the duties of the first and second switches Si and S2.

When an input feedback voltage Vfeedback is lower than a desired voltage level, the divided voltage Vdis is also decreased. When the divided voltage Vdis is decreased, the voltage error signal Serr may be output as a negative voltage or a low voltage and the second pulse width control signal Spwm2 is output as a positive voltage. When the second pulse width control signal Spwm2 is output as a positive voltage, the switch controller 410 increases the duties of the first and second switches S1 and S2 to increase a voltage transmitted to the first power source voltage output terminal OUT.

When the input feedback voltage Vfeedback is higher than a desired voltage level, the divided voltage Vdis is also increased. When the divided voltage Vdis is increased, the voltage error signal Serr may be output as a positive voltage or a high voltage and the second pulse width control signal Spwm2 is output as a negative voltage. When the second pulse width control signal Spwm2 is input as a negative voltage, the switch controller 410 decreases the duties of the first and second switches S1 and S2 to decrease a voltage transmitted to the first power source voltage output terminal OUT.

Meanwhile, the feedback voltage Vfeedback may input as a voltage higher than a desired voltage. In this case, the first differential amplifier Amp1 outputs an over-voltage protection signal Sovp that is higher than a predetermined voltage level. When the over-voltage protection signal Vovp that is higher than the predetermined voltage level is input, the switch controller 410 turns off the third switch S3 to prevent the current and the voltage from being transmitted to the first power source voltage output terminal OUT. That is, when the first power source voltage ELVDD becomes higher than the desired voltage level and the high feedback voltage Vfeedback is input through the feedback terminal FB, an over-voltage protection signal Sovp of a positive voltage is output through the output terminal of the first differential amplifier Amp1. The switch controller 410 compares the voltage of the over-voltage protection signal Sovp with a voltage predetermined for over-voltage protection, and maintains the third switch S3 in the turn-on state when the voltage of the over-voltage protection signal Sovp is lower than the predetermined voltage and turns off the third switch S3 when the voltage of the over-voltage protection signal Sovp is higher than the predetermined voltage. Thus, the switch controller 410 may protect the internal circuit from the over-voltage by controlling turning on/off of the third switch S3 according to the over-voltage protection signal Sovp transmitted from the first differential amplifier Amp1.

During operation of the power controller 400, the feedback voltage Vfeedback may be changed due to instantaneous short-circuit, noise, electrostatic discharge, etc. Since the first power source voltage output terminal OUT is coupled to the first capacitor C1 and the first capacitor C1 may help prevent a sudden change of the voltage of the first power source voltage output terminal OUT, the voltage of the first power source voltage output terminal OUT may not be greatly influenced by the instantaneous short circuit, noise, or electrostatic discharge.

However, the feedback terminal FB is coupled to the plurality of power lines of the display unit 600 and thus may be easily influenced by instantaneous short-circuit, noise, electrostatic discharge of the display unit 600. Absent diode D1, if the feedback voltage Vfeedback is decreased during a very short period of time due to instantaneous short-circuit, noise, or electrostatic discharge, the switch controller 410 may increase the duties of the first and second switches S1 and S2 to increase a voltage transmitted to the first power source voltage output terminal OUT.

The voltage of the first power source voltage output terminal OUT may be increased higher than breakdown voltages of the first and second switches S1 and S2 by switching operation of the first and second switches S1 and S2. When the voltage of the first power source voltage output terminal OUT is increased higher than the breakdown voltages of the switches S1 and S2, an internal circuit of the power controller 400 of a plurality of pixel circuits included n the display unit 600 may be damaged.

When the voltage of the first power source voltage output terminal OUT is increased due to abnormality of the feedback voltage Vfeedback, the over-voltage protection signal Sovp is output from the first differential amplifier Amp1 and the switch controller 410 turns off the third switch S3 to block transmission of the current and the voltage to the first power source voltage output terminal OUT. However, longer than several hundreds of μs delay time may be consumed for the switch controller 410 to receive the over-voltage protection signal Sovp and turn off the third switch S3, and the voltage of the first power source voltage output terminal OUT may be increased prior to the operation of the switch controller 410 due to abnormality of the feedback voltage Vfeedback. Thus, the internal circuit of the power controller 400 or the pixel circuits of the display unit 600 may be damaged due to the increased voltage of the first power source voltage output terminal OUT before the third switch S3 is turned off. However, the power controller 400 is provided with the diode D1 having a predetermined threshold voltage between the first power source voltage output terminal OUT and the feedback terminal FB so that the voltage of the first power source voltage output terminal OUT may be prevented from being higher than the breakdown voltages of the switches S1 and S2 even if the voltage of the feedback terminal FB is suddenly decreased, e.g., due to instantaneous short-circuit, noise, or electrostatic discharge.

For example, assume that the voltage of the first power source voltage output terminal OUT is 5.3V due to switching operation of the first and second switches S1 and S2 when a threshold voltage of the diode D1 is 0.7V, the breakdown voltage of the first and second switches S1 and S2 is 5.5V, and the feedback voltage Vfeedback is 4.6V. When the feedback voltage Vfeedback is suddenly decreased to 4.6V due to the instantaneous short-circuit, noise, or electrostatic discharge, the voltage of the first power source voltage output terminal OUT becomes 5.3V by the switching operation of the first and second switches S1 and S2. As a difference voltage of the voltage of the first power source voltage output terminal OUT and the voltage of the feedback terminal FB reaches the threshold voltage of the diode D1, that is, 0.7V, the first power source voltage output terminal OUT and the feedback terminal FB are coupled to each other through the diode D1. As the first power source voltage output terminal OUT and the feedback terminal FB are coupled to each other, the feedback voltage Vfeedback does not increase lower than 4.6V and the duties of the first and second switches S1 and S2 do not further increase so that the voltage of the first power source voltage output terminal OUT does not exceed 5.3V. Thus, the voltage of the first power source voltage output terminal OUT may be prevented from being higher than the breakdown voltage of the switches S1 and S2 by the diode D1.

In this case, when the voltage of the first power source voltage output terminal OUT, increasing as the feedback voltage Vfeedback is decreased, is lower by a predetermined level than the breakdown voltage of the switches S1 and S2, the diode D1 has a voltage that corresponds to a voltage difference between the voltage of the first power source voltage output terminal OUT and the feedback voltage Vfeedback as a threshold voltage.

As described above, the diode D1 having a predetermined threshold voltage is coupled between the first power source voltage output terminal OUT and the feedback terminal FB so that the voltage of the first power source voltage output terminal OUT may be prevented from increasing higher than the breakdown voltage of the switches S1 and S2 due to abnormality of the feedback voltage Vfeedback caused by instantaneous short-circuit, noise, or electrostatic discharge.

By way of summation and review, abnormality of a power source voltage generated by the DC-DC converter may cause a short-circuit protection (SCP) circuit or an over-voltage protection (OVP) circuit to be operated to shutdown the DC-DC converter and protect an internal circuit. The SCP circuit or the OVP circuit may require substantially several hundreds μs of delay time for operation by sensing the abnormality of the power source voltage. Due to an external influence, e.g., an instantaneous short-circuit, noise, electrostatic discharge, etc., the power source voltage generated from the DC-DC converter may increase to a breakdown voltage that may cause damage to the internal circuit. The instantaneous short-circuit or electrostatic discharge may occur within a period of time that is shorter than several hundreds μs, and thus the internal circuit may be damaged before the SCP circuit or the OVP circuit is operated.

In order to protect the internal circuit from the instantaneous short-circuit or electrostatic discharge using the SCP or OVP circuit, a delay time of the SCP or OVP circuit may be shortened. However, when the delay time of the SCP circuit of the OVP circuit is shortened, the DC-DC converter may be stopped by the SCP circuit of the OVP circuit and thus the screen of the display device may frequently shut down and the display device may need to be restarted whenever the screen is shutdown.

As described above, embodiments may provide a power controller configured to protect internal circuits from instantaneous short-circuit or electrostatic discharge while generating a stable power source voltage, and a display device including the same. The internal circuits may be protected from instantaneous short-circuit or electrostatic discharge, and the power source voltage may be stably generated.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device, comprising:
 a plurality of pixels; and a power controller to supply a first power source voltage and a second power source voltage to the plurality of pixels, wherein the power controller outputs the first power source voltage to a first power source voltage output terminal by converting an input voltage, controls the first power source voltage by controlling a duty of a switch according to a feedback voltage input through a feedback voltage corresponding to the first power source voltage, and prevents the first power source voltage from increasing higher than a breakdown voltage of the switch using a diode coupled between the first power source voltage output terminal and a feedback terminal, wherein:

the power controller includes an inductor coupled to an input terminal to which the input voltage is input, and the switch includes:

a first switch coupled between the inductor and the first power source voltage output terminal, and a second switch coupled between the inductor and a ground.

2. The display device of claim 1, wherein a threshold voltage of the diode corresponds to a voltage difference between the first power source voltage and the feedback voltage when the first power source voltage is lower by a predetermined level than a breakdown voltage of the first and second switches.

3. The display device of claim 2, wherein, when the voltage difference between the first power source voltage and the feedback voltage reaches the threshold voltage of the diode, the feedback terminal is coupled to the first power source voltage output terminal through the diode.

4. The display device of claim 2, wherein the power controller further includes a first resistor and a second resistor coupled in series between the feedback terminal and a ground and dividing a voltage that corresponds to a voltage difference between the feedback voltage and a ground voltage.

5. The display device of claim 4, wherein the power controller further includes a second differential amplifier including a first input terminal to which a voltage divided between the first resistor and the second resistor is input, a second input terminal to which a second reference voltage is input, and an output terminal outputting a voltage error signal that corresponds to a voltage difference between the divided voltage and the second reference voltage.

6. The display device of claim 5, wherein the power controller further includes a third differential amplifier including a first input terminal to which a first pulse width control signal is input, a second input terminal to which the voltage error signal is input, and an output terminal outputting a second pulse width control signal that corresponds to a voltage difference between the first pulse width control signal and the voltage error signal.

7. The display device of claim 6, wherein the power controller controls duties of the first and second switches according to the second pulse width control signal.

8. The display device of claim 1, wherein the power controller further includes a first differential amplifier including a first input terminal to which the feedback voltage is input, a second input terminal to which a first reference voltage is input, and an output terminal outputting an over-voltage protection signal that corresponds to a voltage difference between the feedback voltage and the first reference voltage.

9. The display device of claim 8, wherein the power controller further includes a third switch coupled between the first switch and the first power source voltage output terminal and controls turning on and off of the third switch according to the over-voltage protection signal.

10. The display device of claim 1, wherein the power controller further includes a first capacitor including:

a first electrode coupled to the first power source voltage output terminal, and a second electrode coupled to a ground.

11. The display device of claim 1, wherein the power controller further includes a second capacitor including:

a first electrode coupled to a second power source voltage terminal having the second power source voltage, and a second electrode coupled to a ground.

\* \* \* \* \*